United States Patent [19]

Reifel et al.

[11] Patent Number: 4,751,382
[45] Date of Patent: Jun. 14, 1988

[54] LASER SENSOR WITH ENCODED LASER OUTPUT SIGNAL

[75] Inventors: Michael D. Reifel, Houston, Tex.; Thomas E. Horton, Jr., Oxford, Miss.

[73] Assignee: Reiton, Limited, Houston, Tex.

[21] Appl. No.: 910,897

[22] Filed: Sep. 23, 1986

[51] Int. Cl.⁴ ............................ G01D 5/34; H01S 3/10
[52] U.S. Cl. ................................... 250/231 R; 73/653; 372/20
[58] Field of Search ................ 73/657, 655, 656, 653, 73/800; 250/231 R; 372/20, 44, 36

[56] References Cited

U.S. PATENT DOCUMENTS

| 3,373,401 | 3/1968 | Bayer | 73/653 |
| 3,517,329 | 6/1970 | De Lang et al. | 372/20 |
| 3,675,157 | 7/1972 | Kaminow et al. | 372/20 |

Primary Examiner—David C. Nelms
Assistant Examiner—Michael Messinger
Attorney, Agent, or Firm—Gunn, Lee & Jackson

[57] ABSTRACT

A transducer defined by a laser is set forth. Strain, movement, velocity, temperature, pressure, and vibration coupled to the laser change the lasing frequency or form a Doppler shift. The laser is thus installed at a specified location to couple a measured phenomenon and thereby enable transmission of the encoded variable in the laser beam. A receiver located remote from the laser picks up the beam for data retrieval.

21 Claims, 2 Drawing Sheets

LASER SENSOR WITH ENCODED LASER OUTPUT SIGNAL

BACKGROUND OF THE DISCLOSURE

This disclosure is directed to a sensor for converting certain measurements into a signal suitable for laser transmission, and further sets forth a laser which appropriately encodes the sensed variable, transmits the encoded variable, and enables the transmitted signal to be received. It is particularly adapted for use in systems involving high impact e.g., in using a steam powered pile driver or hammer to drive a piling. In this particular example, a piling of any length and substantial size is subjected to severe impact or shock loading. In a typical situation, assume that a steam powered hammer is positioned to drive a long pile through a pile jacket into the mud bottom beneath a body of water with mud of any depth and water of typical depth. The piling is subjected to severe impact or shock loading which can peak at many g's. With each stroke of the hammer, the hammer falls at instantaneous high velocity, delivers impact to the piling. Several variables are important. One variable is the rate of movement of the gauge position on the piling. Another important factor may be the velocity of the hammer that strikes the piling. There is some energy loss between hammer and piling so that the motion of the hammer and motion of the piling are different. Another important factor is the stress wave which propagates along the piling. This normally has the form of strain which can be observed in the piling.

In the latter instance, the strain is typically measured by a strain gauge on the piling. The present invention enables strain gauge measurements to be obtained away from the piling through wireless communication. More specifically, the present apparatus utilizes a laser telemetry system to encode by means of the laser any data of interest in the laser signal. This arrangement conveys the strain or other data to a remote location where a receiver can be located, thereby enabling the strain or other information to be received, amplified, demodulated as appropriate and converted into data for subsequent analysis and processing.

The strain gauge function is accomplished by means of changing the length of the laser resulting in a change of frequency output of the laser. One application of this concept is to an apparatus comprised of an injection laser diode (ILD). It is supported on a substrate. The substrate is affixed to the piling. The substrate is then subjected to the strain of the piling and thereby applies strain to the ILD. The strain of the laser cavity, a change in length per unit length, causes a shift in the lasing frequency. The unstrained laser has a nominal lasing frequency. As strain occurs, the lasing frequency shifts to thereby encode the strain in the frequency. The strain in the piling is directly proportional to the change in frequency divided by the nominal frequency. This variable is transmitted as a function of frequency and hence is an FM system where the strain is encoded in frequency change, not amplitude. The shift in frequency is discerned from the laser beam. A receiver located remote from the laser transducer picks up the beam for data retrieval.

In addition to this, the laser can be used to determine movement of the piling to which it is attached. It also can be used to measure hammer velocity. One lob in the field pattern transmitted from the laser can be used to measure the distance from the laser to the remote receiver to thereby provide an indication of movement of the laser position on the piling. The particle velocity in the piling, with respect to the position of the remote receiver, is then determined by means of a Doppler effect. A different lob in the field pattern transmitted from the laser can be used so that hammer velocity is determined by means of a Doppler effect. To this end, the laser transmits the signal to a reflector mounted on the hammer which is reflected to a receiving system, encoding hammer velocity in a Doppler shift.

Another important application of the present apparatus is in the measurement of stresses and vibration occurring in rotating machinery. A typical rotating machine might be a motor, generator, compressor or turbine. Another type machine might be a centrifugal pump. In this context, a machine typically has an external fixed cabinet or housing which encloses the rotating parts. The rotating parts are subjected to stress and vibration. Heretofore, it has been possible to obtain such data and send it out of the machine either by means of commutated conductors or perhaps through an FM telemetry system. The present apparatus however overcomes the limitations of such apparatus and provides a system combining the sensor with the telemetry linking equipment. The sensor is preferably a laser which responds by forming modulated laser output data and is thereby able to transmit free of commutator for reception adjacent to the rotating machinery. For instance, assume that the rotating machinery is susceptible of significant damage and harm in the event that the bearings of the shaft of the rotating machinery were to fail. Partial bearing failure is typically indicated by vibrations coupled through the shaft to the rotating components of the machinery. Other variables of interest can be coupled through the laser for reception remote from the rotating components free of commutated connection.

As will be understood, the foregoing describes different settings in which the apparatus of the present disclosure can be installed and used to provide data indicative of strain, vibration, movement or velocity. It takes advantage of the sensitivity of a laser to the direct mounting of the laser on the equipment to be monitored and therefore is able to convert the monitored data into a laser beam modulation and therefore is successful in delivery of the variable of interest without commutation. A quality linkage is achieved free of the difficulties and maintenance associated with commutators, FM telemetry systems, and the like.

DETAILED DESCRIPTION OF THE DRAWINGS

So that the manner in which the above recited features, advantages and objectives of the present invention are attained and can be understood in detail, more particular description of the invention, briefly summarized above, may be had by reference to the appended embodiment thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
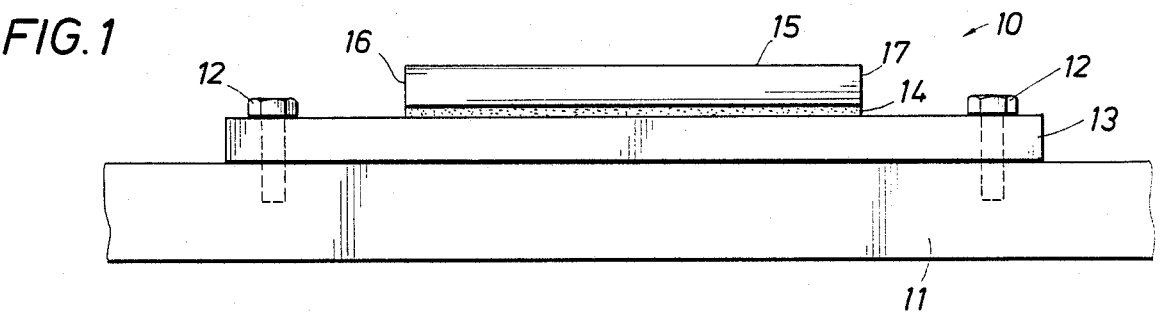
FIG. 1 shows in sectional view a semiconductor laser adhered to a supportive substrate and installed for providing strain measurements.

Attention is first directed to FIG. 1 of the drawings where an IC laser telemetry system of the present disclosure is identified by the numeral 10. FIG. 1 shows the preferred embodiment, an IC laser telemetry device, but other forms of laser can be used including gas lasers. It will be described in the context of measuring strain as a first example of the mode of operation of the device. Other examples, including different types of measurements, will be given also.

In FIG. 1, a specimen 11 to be measured is subjected to strain by means not shown, and the strain changes the length of the member 11. The member 11 is drilled and suitable bolts 12 attach a substrate 13 to the specimen 11. An adhesive 14 is used to attach a semiconductor laser 15. The substrate 13 is any suitable base member which can be used for supporting a semiconductor. An isolation layer such as an adhesive 14 can be placed on it. Alternatively, the substrate might be nonconductive material (doped silicon dioxide) wherein the semiconductor is deposited thereabove. In that instance, the substrate 13 can be a typical MOS layer with the layer 14 placed on it by conventional deposition techniques. The layer 14 can be conductive or insulative, but in the preferred embodiment, it is made of an insulative material such as appropriately doped silicon compound such as silicon nitride. The measure of doping determines the measure of electrical insulation.

The semiconductor 15 forms an IC laser. Lasers are generally three different types. One type of laser is formed of a solid body having mirrored parallel end faces at a specified length. It is not uncommon to make such devices of various materials including ruby. More recent material include YAG. An alternative form of laser is a gas laser, one typical form being $CO_2$ gas. It is contained within a housing having ends where the laser beam is emitted from the ends. The preferred embodiment is directed to an IC laser wherein the IC chip 15 forms the laser beam emitted from the ends at 16 and 17. The device is symmetrical and emits laser beams from the two ends. In contrast with other types of lasers which define a very narrow beam having almost no divergence, the IC laser 15 forms beams from the ends 16 and 17 which have some divergence. Other lasing devices can be used also. More will be noted regarding beam divergence on describing FIG. 3.

Figure 2:
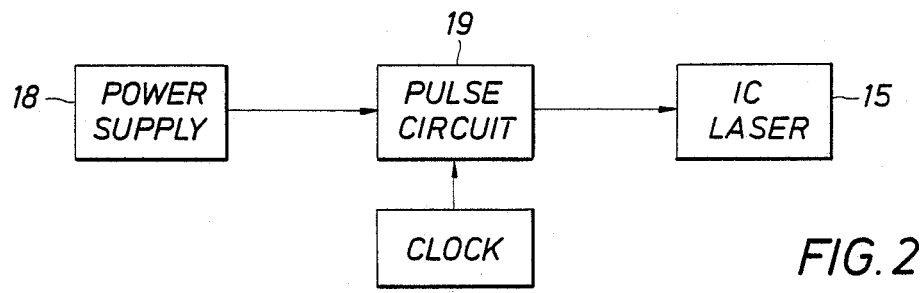
FIG. 2 is a schematic block diagram of components for operating an integrated circuit laser.

The IC laser 15 requires supportive circuitry. FIG. 2 shows a power supply 18 which provides power switched by a pulse circuit 19 timed by a clock. In turn, the pulsed power is supplied to the laser 15 to trigger its operation. More regarding operation of the laser will be described in detail.

Going back to FIG. 1 of the drawings, the IC laser 15 has a specified length between the ends faces 16 and 17. The IC laser is mounted so that it strains with the metal member 11. When such strain occurs, the length of the IC laser is changed, thereby changing the spacing of the end faces 16 and 17. When the spacing changes, the frequency of the monochromatic light emitted as a coherent light beam is changed. If the length is left unchanged, the frequency of the IC laser is fixed. When strain occurs, the strain is coupled from the specimen 11 into the substrate 13. In turn, that strain is coupled into the IC laser 15. This causes the lasing action to change frequency emitted from the laser. It is possible that there will be amplitude changes, but they are less important than the changes in frequency for reasons to be described.

Figure 3:
FIG. 3 is a side view of the radiation pattern of an IC laser.

Attention is now directed to FIG. 3 where the IC laser 15 is shown in side view. There is a radiation pattern for the beam. Moreover, the beam tends to spread to define off axis sensitivity. This sensitivity at an off axis location is valuable as will be described below. Alternately, the beam can be deflected, reflected or refracted by a mirror, prism, grating or other light responsive device.

Figure 4:
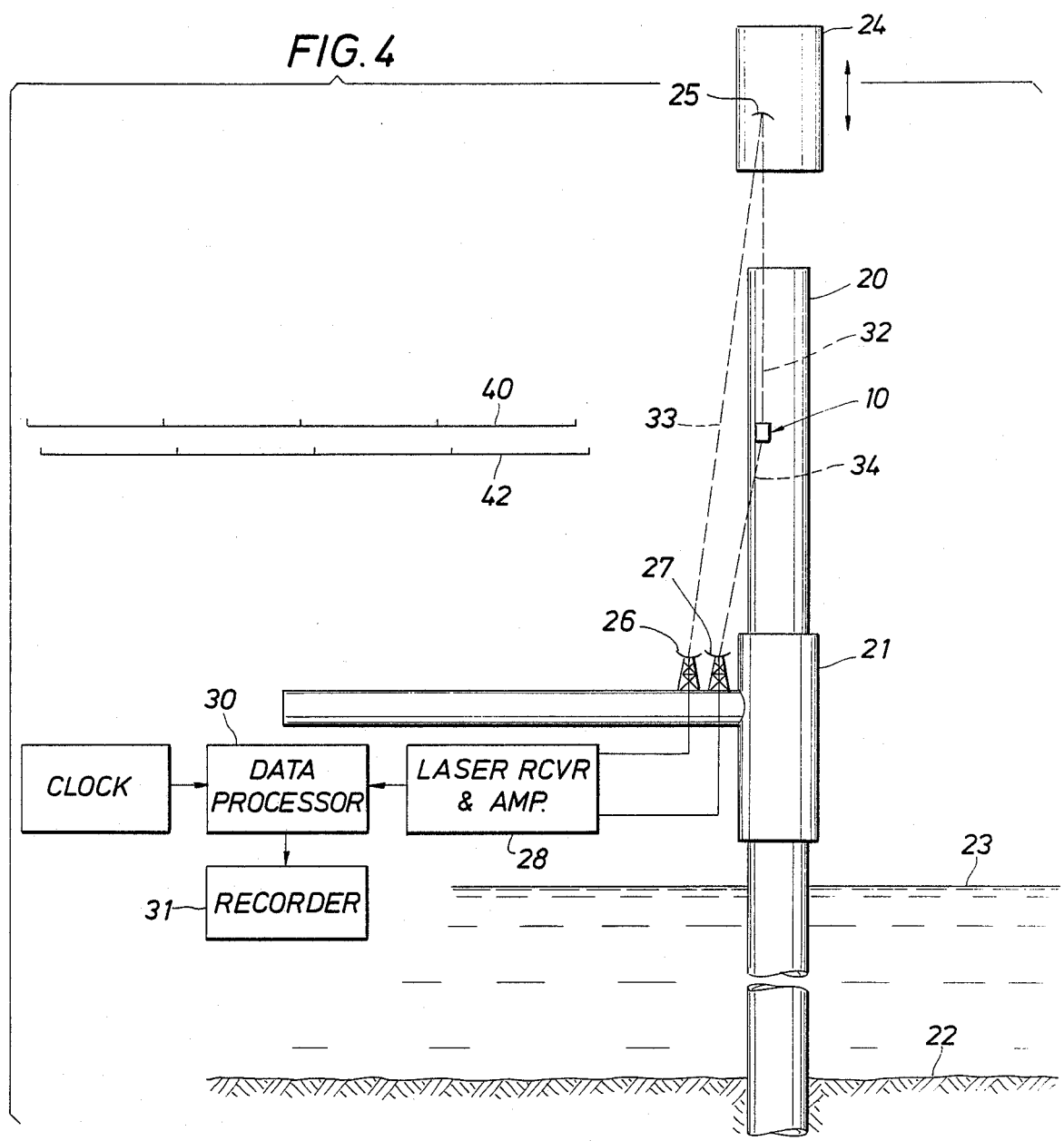
FIG. 4 shows an IC laser telemetry system of the present disclosure installed on a piling for transmitting data regarding the piling strain, piling movement, piling particle velocity and hammer velocity to a remote location.

Attention is now directed to FIG. 4 of the drawings. A pile 20 is being driven through a jacket 21 and is embedded in the mud 22 beneath a body of water 23. It is driven by a reciprocating hammer 24, typically a steam powered hammer. The jacket 21 serves as a fixed platform during installation of the pile 20. The IC laser 10 is installed on the pile 20 at a suitable location. A reflector 25 is installed on the hammer, and it is positioned to reflect the laser beam along the specified path. Two receiving dishes are indicated at 26 and 27. In turn, they connect with a laser receiver and amplifier 28. This converts the laser signal by extracting the encoded information and delivers the encoded data to a data processor 30. That processes the data and delivers the data to a recorder 31.

Going again to the reflector 25, the ray path from the IC laser to the reflector 25 is identified by the numeral 32. On reflection, the same beam then travels along the path 33. There is another pathway which is separate from the reflected path 33. It is identified by the numeral 34. It will be described as the direct pathway from the IC laser to the receiver. The term "receiver" will thus refer to the receiver system as well as the receiver, antenna, and amplifier indicated at 28.

Assume for the moment that the IC laser 10 is stationary. When the hammer 24 moves, it creates a Doppler shift in frequency. The shift is related to the velocity of the hammer during hammer movement. The hammer travels in a reciprocating fashion. Its movement can be traced along the reciprocating path for the hammer. The signal on the pathway 32 from the reflector 25 is used to encode hammer movement. Hammer velocity can be obtained and that data can be integrated and differentiated to thereby obtain hammer position and hammer acceleration. Thus, the first specific form of data from the system shown in FIG. 4 is recovery of hammer position, velocity and acceleration. This can be obtained by providing a continuous wave (CW) signal from the IC laser system 10 or it can be obtained through a pulsed system. In either case, the data is indicative of hammer data.

After the hammer strikes the piling 20, strain developed in the piling from the impact loading propagates along the piling to form a strain in the piling in the vicinity of the IC laser system 10. This is coupled as shown in FIG. 1 into the IC laser and thereby shortens the spacing between the ends faces 16 and 17. This creates a frequency shift in operation of the IC laser. The beam path 34 from the IC laser delivers this encoded information. Thus, strain is converted into a frequency shift. The shift from a specified or nominal frequency is proportionate to changes in length of the apparatus shown in FIG. 1 with strain. This provides another type of data along the signal path 34.

A third type of data which is obtained from the system is the relative distance between the IC laser 10 and the receiver. Assume, as an example, that the pulse circuit 19 shown in FIG. 2 is pulsed periodically, say with a spacing of one pulse precisely timed every ten milliseconds. An example of this is shown in the pulse train 40 in FIG. 4. The receiver forms a receiver pulse train 42. The pulse train 42 is shifted from the pulse train 40 by a specified time. The initial time shift is really not important other than to know that there is an initial time delay required for propagation of the light transmitted from the IC laser 10 the receiver. This defines an initial time shift. When the piling is driven into the subsurface at 22, it moves closer, thereby shortening the propagation path. As it moves, the time shift between pulses in the two trains 40 and 42 changes, indicating the shortening of the propagation path 34. FIG. 4 has shown the path 34 to be slightly at an angle with respect to the axis of the piling. In actuality, the propagation path 34 is conveniently parallel to the center line axis of the piling. In other words, the propagation path is substantially parallel to the axis of the piling. On or off axis data linking is readily available; if the laser and receiver are positioned to create laser beam coupling problems, the problems can be overcome by means of light beam reflectors, etc., such as prisms, mirrors and the like. In this event, the change in time delay is indicative of the movement of a point of the piling. This represents another type of data obtained from this system, namely, movement (hence, rate of movement) of a selected point on the piling, or particle velocity. When the laser on the piling moves with respect to the receiver, movement creates a Doppler shift related to particle velocity.

Figure 5:
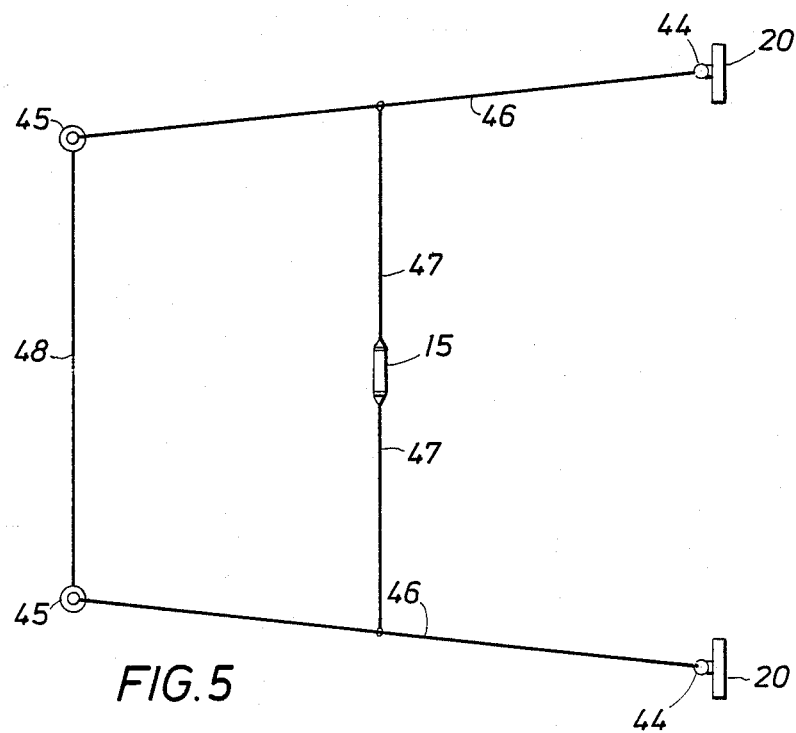
FIG. 5 is a view of an alternative mounting apparatus installing an IC laser on a piling to obtain a multiple of strain input for transmission.
Figure 6:
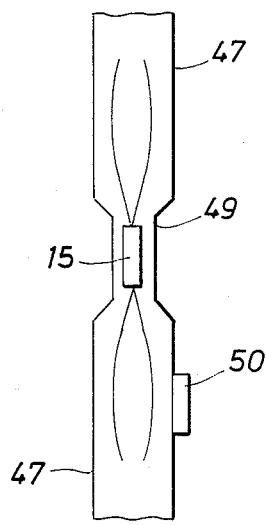
FIG. 6 is an enlarged detailed view of the apparatus shown in FIG. 5 including details of construction of the laser and support equipment therefor.

Attention is now directed to FIGS. 5 and 6 which shown an alternate mounting mechanism. Assume that the piling 20 supports a pair of spaced and aligned eyelets 44 as shown in FIG. 5. They are connected to a pair of arms 46 joined at hinges 45 with a strut 48. The arms 46 are relatively hinged and rotate towards one another when an axially compressive load is placed on the piling during hammering. When the strain is released, the arms 46 rotate away from one another. The arms 46 in turn connect at some mid point with a bar 47. The bar is shown in better detail in FIG. 6 where the IC laser is mounted on the bar.

The electronic equipment for operation of the IC laser shown in FIG. 2 is placed in a housing 50 which is mounted next to or in the vicinity of the IC laser. Ideally, the electronic equipment for operation of the IC laser, and the IC laser are contained in the same integrated circuit chip. The bar 47 can be transparent or at least translucent, permitting the coherent laser light beam to pass through the translucent member upwardly and downwardly from the IC laser. Again, sufficient beam spread and reflection can be obtained with prisms so that the bar 48 need not be translucent.

This arrangement shown in FIGS. 5 and 6 provides a multiple of the strain between points 44 of the piling 20. The purpose of this apparatus is to scale (increase or decrease) the strain actually measured by the IC laser 15 from the strain sensed at the attachment points 44. While strain is a function of gauge length, by increasing or decreasing the distance between points 44, the strain can be amplified or attenuated as desired. Since stress is a function of strain, and is measured across a cross sectional area, the strain in section 49 can be amplified or attenuated by altering the cross sectional area of the bar 47 as desired.

Figure 7:
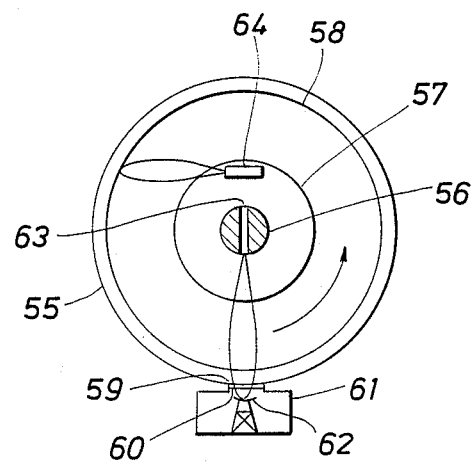
FIG. 7 shows a laser telemetry system installed on a rotating device.

Attention is now directed to FIG. 7 of the drawings. There, the numeral 55 identifies the surrounding shell or housing of rotating machinery. One example of rotating machinery is a motor or generator, and other examples include devices which rotate at higher speeds such as turbines. The central rotatable shaft 56 supports a hub 57 which in turn supports rotating components at 58. In the event of a motor or generator, that is the rotating magnetic cage while in the case of a turbine, that would describe the buckets. The hub 57 is aligned with a port 59 which is open through the shell 55. A window 60 is placed in that port. The window provides an interior view toward the hub. The window 60 opens into a housing 61 which supports a receiver antenna system 62 for laser transmission. Alternatively, the receiver can be housed inside the machinery housing.

A first IC laser is identified at 63 and is conveniently mounted to align with the port 59 to thereby project a beam out through the port. The beam passes through the port and is observed by the receiver antenna system 62. The IC laser mounted at 63 is positioned in a slot formed in the shaft 56. The beam is located to enable the data to be laser coupled from the rotating shaft.

An alternate location for the IC laser is shown at 64 where it is mounted on the hub 57. It is offset to the side of the axis of rotation. It is aligned so that the beam sweeps over the port 59. Recall that the beam has a measure of divergence. This permits the beam to fall on the chamber window 60 and pass to the receiver antenna system 62. Moreover, beam projection from both locations can be observed at the receiver 62. Accordingly, this arrangement utilizes two different IC's which are synchronously observed by the receiver system 62.

The IC laser 64 can be affixed to the hub in the fashion illustrated in FIG. 1. This enables stresses in the hub which cause strain or vibration to be converted into a laser signal. Alternatively, the IC laser 63 responds in frequency to shaft vibrations and thereby convert the vibrations to laser encoded data. This technique enables the information to be coupled out of the rotating machinery without commutating the signals. Moreover, the laser beam can pass through steam or gases in the chamber. The steam would otherwise obscure the transmission path for veisible light transmission. The laser frequency is selected so that the steam is not able to block signal transmission. In similar fashion, if the turbine is gas fired, there will be a cloud of incandescent gases in the near vicinity of the turbine but again, the laser frequency can be selected so that it is not obscured by the hot gasses being combusted in the turbine. In the latter event, the temperature increase in the vicinity of the IC laser may require that the laser be cooled as for example, by conducting a flow of coolant in the near vicinity. If the IC laser 63 is exposed to lubricating oil, the laser beam can penetrate a significant thickness of this. This is especially true in view of the fact oil is centrifugally forced outwardly. The port 59 is preferably located at the top so that lubricant does not settle in the port and thereby block laser transmission.

Another variable of interest is temperature. By selection of materials and dopants in the laser, it can be made to operate at selected temperature (including high temperatures) with and without cooling. The lasing frequency varies with temperature; hence, the laser frequency can be calibrated as a function of temperature to enable encoding of temperature as a variable.

Figure 8:
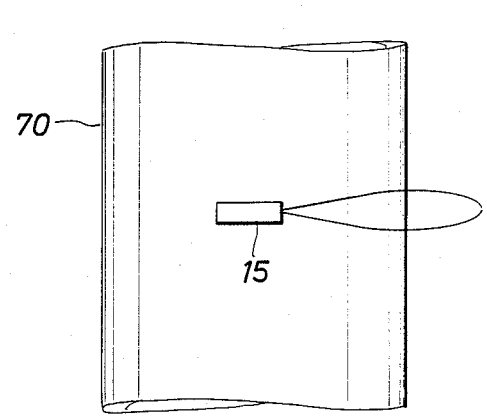
FIG. 8 shows a pressure measurement system using the present apparatus.

In the arrangement of FIG. 8, an IC laser is fastened to a pressure vessel 70. The vessel is typically constructed of metal of specified thickness, and expands with pressure. When the pressure is reduced, it will contract to an unstressed size. The pressure in the vessel 70 creates stress in the metal member, causing strain in the metal acting on the IC laser. The strain causes the lasing frequency to shift and thereby encodes pressure as a frequency shift. The shift is measured and yields a value proportional to pressure. This value can be calibrated directly as pressure if desired.

The precise laser frequency choice can be varied widely. This is achieved by appropriate doping of the materials in the IC laser. The dopant is selected to obtain the desired frequency by relationships that are belived to be well known.

While the foreoing is directed to the preferred embodiment, the scope is determined by the claims which follow.

We claim:

1. A system for transmitting a variable from a member subjected to variation, comprising:
   (a) a laser;
   (b) means for attaching said laser to a member wherein the member is subjected to stress internally of the member;
   (c) said attaching means securing said laser so that said laser is subjected to changes with stress of the member, and wherein said laser emits a lasing signal encoding the stress from the member; and
   (d) receiving means for receiving the lasing signal varied with stress in the member.

2. The apparatus of claim 1 including a mounting substrate adhered to a laser body having two spaced ends wherein said substrate is attached to the member to be stressed with the member.

3. The apparatus of claim 1 including power supply means for operating said laser.

4. The apparatus of claim 1 including pulsed control means for periodically operating said laser.

5. The apparatus of claim 1 wherein said laser is an elongate body having two spaced, parallel end faces for emitting laser beams therefrom and said body is fixed to the member by said attaching mass so that member stress is coupled into said body.

6. A system for transmitting movement data from a moving member, comprising:
   (a) a laser for emitting a transmitted signal;
   (b) means for attaching said laser to a moving member so that said laser emits a signal from said laser;
   (c) remote means for receiving a transmitted laser signal from said laser; and
   (d) wherein said laser transmitted signal encodes member movement into the laser transmitted signal.

7. The apparatus of claim 6 wherein the member movement is vibration, and said laser encodes vibration in the lasing frequency of the transmitted signal.

8. The apparatus of claim 6 wherein said member movement is relative to a reference member, and including means for reflecting a transmitted signal from said laser, said reflecting means and said laser being installed on the moving member and reference member to enable a reflected transmitted signal to encode member movement relative to the reference member.

9. The apparatus of claim 6 wherein said attaching means comprises means fixedly attaching said laser to the moving member.

10. Apparatus for monitoring a pile during hammering of the pile, comprising:
    (a) a laser;
    (b) means for mounting said laser on a pile;
    (c) remote means for receiving laser transmission from said laser; and
    (d) means encoding pile data in the laser transmission.

11. The apparatus of claim 10 wherein said mounting means is connected to a pile to respond to strain in the pile between two spaced points on the pile.

12. The apparatus of claim 10 wherein said mounting means is connected to respond to pile ranging.

13. The apparatus of claim 10 wherein said mounting means is connected to respond to pile particle velocity in the pile.

14. The apparatus of claim 10 including a reflector for laser tranmission from said laser, said reflector being mounted on a hammer for hammering the pile.

15. The apparatus of claim 14 including first and second remote means for receiving laser transmission;
    first and second laser beams formed by said laser for laser transmission; and
    wherein said first and second laser beams are received by said first and second remote means.

16. The apparatus of claim 15 wherein said first laser beam is reflected by said reflector and received by said first remote means, and said second beam is received by said second remote means.

17. A method of transmitting information from a member comprising the steps of:
    (a) installing a laser on a member to be monitored:
    (b) transmitting a laser beam from the laser;
    (c) receiving the laser beam from the laser; and
    (d) encoding in laser beam information representative of the member wherein the member acts on the laser to cause such encoding in the beam from the laser.

18. The method of claim 17 wherein the encoding step is achieved by coupling member movement to the laser.

19. The method of claim 17 wherein the encoding step is achieved by coupling member strain to the laser to change laser operation.

20. The method of claim 17 wherein the encoding step is achieved by coupling member vibration to the laser to change laser operation.

21. The method of claim 17 wherein the encoding step is achieved by coupling member temperature to the laser to change laser frequency.

* * * * *